United States Patent [19]
Orr et al.

[11] Patent Number: 5,305,007
[45] Date of Patent: Apr. 19, 1994

[54] WIDEBAND RADAR DETECTOR

[75] Inventors: Steven K. Orr, Loveland; John R. Kuhn, West Chester, both of Ohio

[73] Assignee: Cincinnati Microwave Corporation, Cincinnati, Ohio

[21] Appl. No.: 48,128

[22] Filed: Apr. 13, 1993

[51] Int. Cl.$^5$ .................................................. G01S 7/40
[52] U.S. Cl. ........................................ 342/20; 455/228
[58] Field of Search .............. 342/20, 98, 99, 104, 342/116; 455/226.1, 226.4, 228

[56] References Cited

U.S. PATENT DOCUMENTS

| | | | |
|---|---|---|---|
| 4,581,769 | 4/1986 | Grimsley et al. | 455/226 |
| 4,622,553 | 11/1986 | Baba et al. | 342/91 |
| 4,630,054 | 12/1986 | Martinson | 342/20 |
| 4,698,632 | 10/1987 | Baba et al. | 342/17 |
| 4,723,125 | 2/1988 | Elleaume | 342/194 |
| 4,750,215 | 6/1988 | Biggs | 455/226 |
| 4,772,889 | 9/1988 | Elleaume | 342/194 |
| 4,862,175 | 8/1989 | Biggs et al. | 342/20 |
| 4,929,954 | 5/1990 | Elleaume | 342/194 |
| 5,033,019 | 7/1991 | White | 364/726 |
| 5,068,663 | 11/1991 | Valentine et al. | 342/20 |
| 5,079,553 | 1/1992 | Orr | 342/20 |
| 5,099,194 | 3/1992 | Sanderson et al. | 324/78 |

*Primary Examiner*—John B. Sotomayor
*Attorney, Agent, or Firm*—Limbach & Limbach

[57] ABSTRACT

A wideband radar detection apparatus includes a signal detection section, high rate signal processing section and a low rate signal processing section. The signal detection section sweeps through a range of preselected frequencies and generates an output signal having a pair of single cycle sinusoids for every detected signal. The output signal is provided to the high rate signal processing section and a Sliding Window Discrete Fourier Transform is performed thereon to generate a set of complex values that are related to the fundamental energy content at consecutive points in the sweep. The low rate signal processing section controls sweep parameters and also evaluates the complex values. If the magnitude of the complex values exceed a predefined threshold, then an alert is indicated.

11 Claims, 6 Drawing Sheets

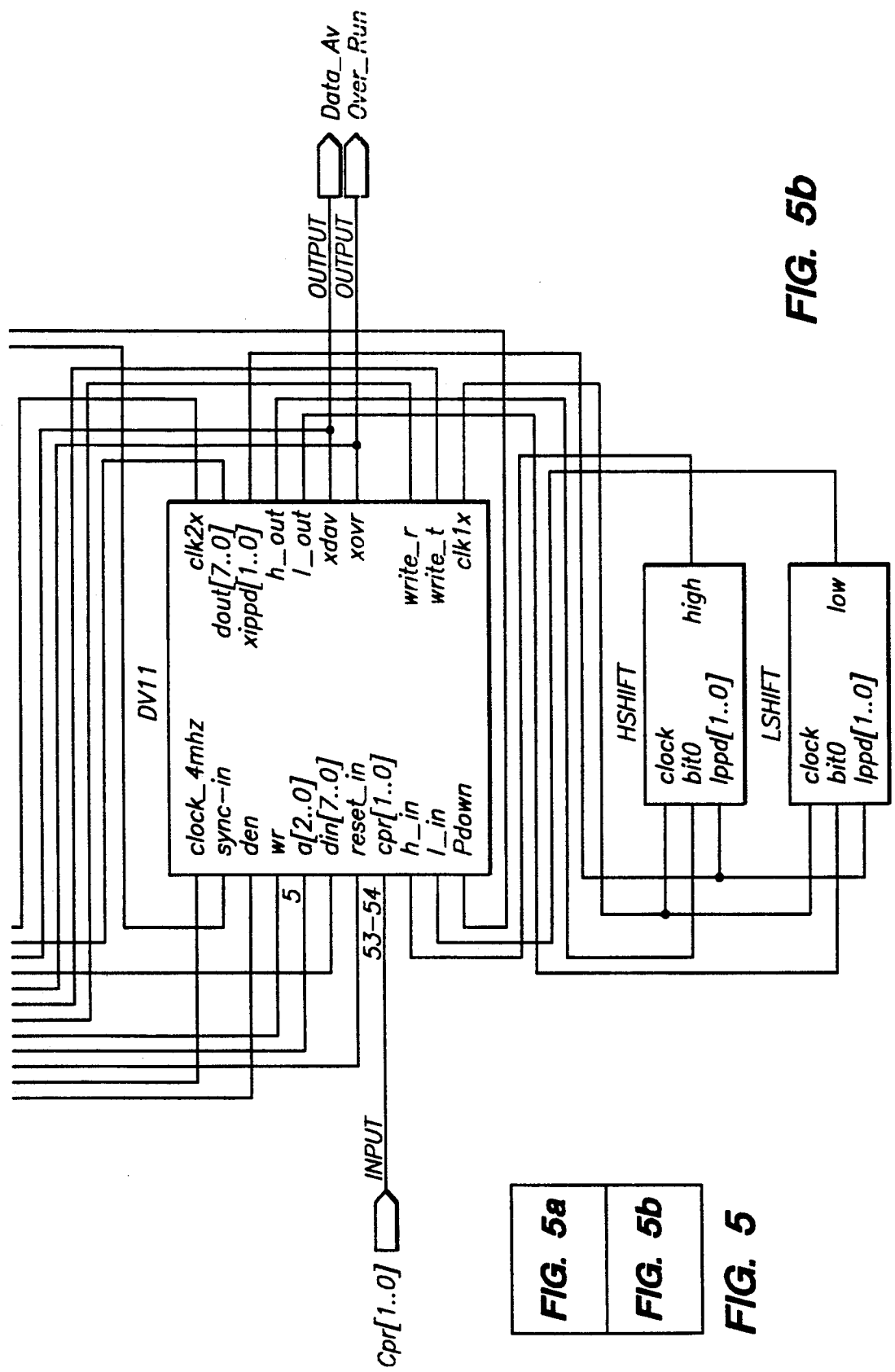

WIDEBAND RADAR DETECTOR

FIELD OF THE INVENTION

The present invention relates to a police radar detector, and more particularly, to a wideband radar detector which efficiently and economically detects valid police radar signals which are present in the X, K, and Ka signal bands and which will ignore interfering signals generated by other radar detectors.

BACKGROUND OF THE INVENTION

An electronic assembly for detecting the presence of police radar signals is generally known, and will be referred to herein as a radar detector. In use, the radar detector is mounted in a vehicle and provides an audible and/or visual indication of the presence of a police radar signal.

Many known radar detectors cover two signal bands, namely the X band (10.525 GHz+/−25 MHz) and the K band (24.15 GHz+/−50 MHz). Other known radar detectors cover three signal bands, namely the X band, the K band, and a narrow Ka band (34.3 GHz+/−100 MHz).

More recently, the Ka band has been widened and is now specified to be 34.7 GHz+/−500 MHz. However, a problem has arisen is trying to cover this widened Ka band. A radar detector generally has either a fixed or sweeping first local oscillator that emits a signal centered around 11.559 GHz. The third harmonic of this signal (3×11.559 GHz=34.677 GHz) falls within the wide Ka band. This signal is radiated out from the antenna of the radar detector and may be received by other radar detectors. If this signal is fixed, it appears to other radar detectors to be a police Ka radar signal and therefore causes these other radar detectors to generate an alert.

As can be appreciated, the only difference between a valid police Ka band radar signal and an interfering signal caused by another radar detector is that the interfering signal has energy radiated at the fundamental frequency and the second harmonic frequency in addition to the third harmonic frequency. Thus, it would be desirable to have a radar detector that could simultaneously determine if there was energy present at the fundamental and second harmonic frequencies when a signal was detected in the wide Ka band, and not alert under these conditions.

Furthermore, in recent years, a number of automatic door openers have been designed to use microwave signals to detect the proximity of people. Although these signals usually appear as X band sources to radar detectors, a group of x band door openers may have the signal properties associated with a k band source. Accordingly, a new false signal rejection scheme is necessary.

A disclosure of the general operation of police radar and police radar warning receivers is provided in U.S. Pat. No. 5,079,553, which is commonly assigned to "Cincinnati Microwave, Inc." (hereinafter referred to as "CMI") and is hereby incorporated by reference. U.S. Pat. No. 5,079,553 discloses a police radar warning receiver including a DSP circuit having a correlator and peak detector. The output of an FM discriminator is digitally sampled so that the magnitude of each digital sample word corresponds to the magnitude of the signals and noise received at the X and/or K band frequencies. Each sample word is then manipulated in a digital correlator and coupled to an averager which performs accumulating and averaging operations for each sample interval or group of intervals. A peak detector compares averager words with a current dynamic threshold. To avoid false alarms, the DSP circuit includes an index memory operating in conjunction with the peak detector to provide sweep-to-sweep comparison. If none of the averager words exceed the dynamic threshold and one or two of the same averager words present the largest magnitude for an extended period of time, an alarm enable is provided. Also, the peak detector evaluates the spacing between those segments which have magnitudes exceeding the dynamic threshold to determine whether the alarm enable should indicate an X or K band.

U.S. Pat. No. 5,068,663 discloses a radar detector which utilizes an amplitude detection scheme to detect radar signals. As shown in FIG. 1 of that patent, the radar detector 100 monitors the X, Ku, K and Ka bands. Amplitude signals are down-converted by a series of mixers and compared to a threshold. Detected amplitude signals must persist for a minimum period of time before the microprocessor 128 performs signal verification.

U.S. Pat. Nos. 4,929,954, 4,772,889, and 4,723,125 disclose devices for calculating a discrete moving window Fourier transform for use in the processing of a pulse compression radar signal. As shown in FIG. 1 of U.S. Pat. No. 4,772,889, a plurality of stages (E) receive samples of the signal x(t) for which a Fourier transformation is sought. To reduce the number of operations performed when the number of stages (E) becomes large, the complex rotation performed by the operator 1 is broken down into a first rotation in the first quadrant that is performed in a way common to all of the stages. Then an additional rotation for each stage equal to 0, 1, 2, or 3 times pi/2 is performed.

U.S. Pat. No. 5,099,194 discloses a digital frequency measurement receiver having an improved bandwidth. As shown in FIG. 1 of the patent, RF signal 10 is mixed with a signal from a local oscillator 12 and then provided to power dividers 32. The mixed signal is divided and supplied to analog to digital converters 42 and 44. Each converter operates at a different sampling frequency. The signal is then supplied to a processor 50 where a Fourier transform is performed to determine a frequency f.

The ESCORT and PASSPORT radar detector products, manufactured by Cincinnati Microwave, Inc., use a correlation scheme to detect the presence of a single period sinusoid, or s-curve. The signal is converted to a digital equivalent with a single bit of precision. Identifiable sets of 0's and 1's will result from the sinusoid or its 180 degree out of phase equivalent. These are conveniently recognized by a low gate count digital circuit. The digitized result is correlated by counting the number of occurrences of 0's followed by 1's. A detection occurs when at least 16 0's are followed by at least 16 1's. The opposite case will also generate a detect and is represented by 16 1's followed by 16 0's.

The NEW ESCORT radar detector, also manufactured by Cincinnati Microwave, Inc., was designed to take advantage of techniques available in spectral processing. It focused on measuring spectral content of portions of the FM demodulator output data collected during the sweep. The detection criterion was chosen to see if the amplitude of the s-curve component exceeded a threshold.

Detecting signals in a wideband creates problems that are not overcome by the prior art. A wideband radar detector picks up the 1000 MHz wide Ka band as well as the X and K Bands handled by more primitive products. The Ka band is 5 to 10 times wider than X and K bands. If the sweep time is held constant, a Ka sweep would then produce an s-curve that is 10 times higher in frequency than that of the X/K sweep. Equivalent analysis processing would require 10 times the throughput. Additional complications arise when the competing considerations of product cost and product sensitivity are taken into account.

Thus, a low cost but high throughput process is needed. Also, for flexibility, the process should be optimized in a software setting.

SUMMARY OF THE INVENTION

The present invention is a radar detector that detects signals in the broad Ka band while ignoring interfering radiation from other radar detectors. The radar detector utilizes a high rate processor and a low rate processor to evaluate received signals. The high rate processor provides high throughput and the low rate processor provides programmable features.

In a preferred embodiment, the high rate processing is performed by a custom Application Specific Integrated Circuit ("ASIC") that uses a pipelined architectural approach to enable high speed processing and information throughput. According to the present invention, the throughput rate is equal to the clock rate. The low rate processing is performed by a low cost programmable digital signal processor ("DSP") chip.

In operation, the detector sweeps a voltage controlled oscillator ("VCO") through a range of frequencies to detect signals in the X, K, and Ka signal bands. The signals mix with the sweeping VCO to produce a new set of sweeping frequencies that are down converted and passed to an FM demodulator, where a single period sinusoid ("s-curve") is produced for any signal that falls within the desired range.

The ASIC employs a sliding window discrete Fourier Transform ("SWDFT") to reduce the number of processing operations. A discrete Fourier Transform ("DFT") is obtained over some narrow range of frequencies. By using the SWDFT, once the DFT of a window in known, the DFT of an adjacent window can easily be calculated. Successive DFT calculations produce complex values representative of the energy content at consecutive points of the sweep. The magnitude of these complex values may then be compared to a threshold to determine if a valid signal is present. Alternatively, this step may be approximated by evaluating every Nth value.

The complex values are averaged to improve the signal to noise ratio. Also, by averaging each new complex value into the previously calculated average, a "sliding average" is computed. Thus, a continuously updated result is obtained.

The DSP chip sends a control value to the ASIC in order to tune the ASIC to a particular s-curve frequency. The time it takes the ASIC to collect and produce a new complex output value is known as the processor data period. This time period determines the maximum execution time available to the DSP chip for processing each new value. During the time between subsequent sample values, the DSP chip must read the value from the ASIC and average it into memory. Peak detection and signal verification are also handled in the DSP chip.

DETAILED DESCRIPTION OF A PREFERRED EMBODIMENT

1. Receiving and Detecting a Signal

Figure 1:
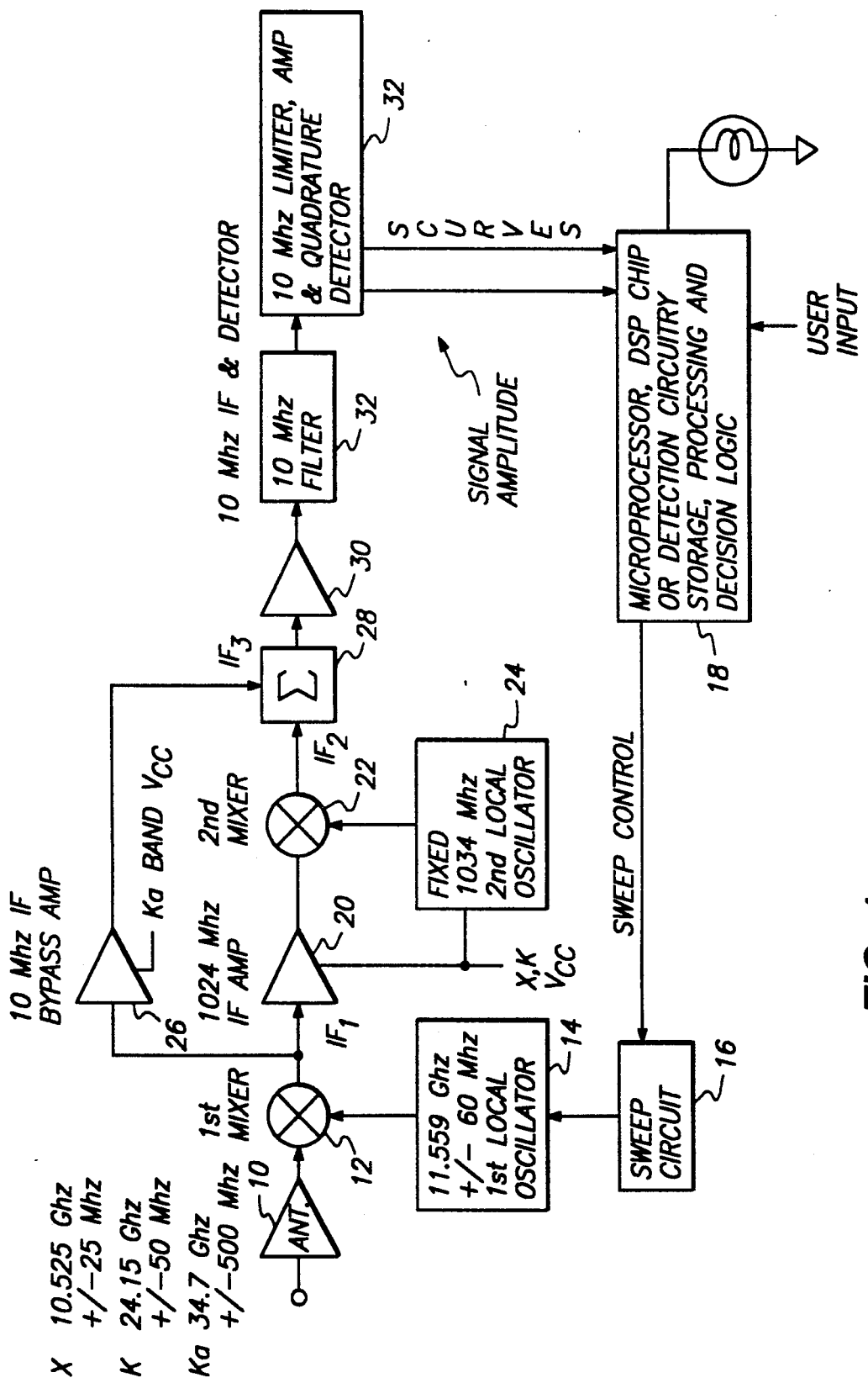
FIG. 1 is a block diagram of a preferred embodiment of a radar detector according to the present invention.

A block diagram of the present invention is illustrated in FIG. 1. An incoming signal is received at antenna 10 and mixed by a first mixer 12 with a sweeping signal from a first local oscillator 14 to generate a first sweeping intermediate frequency signal $IF_1$. A sweep circuit 16 controls the first local oscillator 16 in response to master control by a microprocessor 18.

Two separate sweep cycles are provided by the sweep circuit 16. During the first sweep cycle, the X and K bands are processed, and during the second sweep cycle, the Ka band is processed, as will be described in more detail below.

When processing X and K band signals, i.e., during the first sweep cycle, the sweeping signal from the first local oscillator 14 is 11.559 GHZ +/−60 MHz. For X band signals, the first mix is a fundamental high side mix (upper heterodyne) that results in a sweeping intermediate frequency signal $IF_1$ of 1024 MHz (11.559 GHz-10.525 GHz). For K band signals, the first mix is a second harmonic low side mix (lower heterodyne) that also results in a sweeping intermediate frequency signal $IF_1$ of 1034 MHz (24.15 GHz−(2×11.559 GHz)).

The first sweeping intermediate frequency signal $IF_1$ is amplified by amplifier 20 and then mixed by a second mixer 22 with a fixed signal from a second local oscillator 24 to generate a second sweeping intermediate frequency $IF_2$. The fixed signal from the second local oscillator 24 is 1034 MHz.

When processing Ka band signals, i.e., during the second sweep cycle, the amplifier 20 and second local oscillator 24 are turned off. The microprocessor 18 causes the sweep circuit 16 to increase the sweeping signal from the first local oscillator 14 to 11.559 GHZ+/−200 MHz. Thus, the third harmonic of the first local oscillator 14 (34.677 GHz+/−600 MHz) is mixed with the incoming signal and then amplified by bypass amplifier 26 to produce a third sweeping intermediate frequency signal $IF_3$ at 10 MHz.

The second sweeping intermediate frequency $IF_2$ and the third sweeping intermediate frequency $IF_3$ are summed by summer 28, although the net effect is that signal IF$_2$ is passed through the summer during the first sweep and signal IF$_3$ is passed through the summer during the second sweep. Each signal is then passed through amplifier 30, bandpass filter 32, and then limited and demodulated by a quadrature detector 34 during its respective sweep cycle in a manner that is known and explained in U.S. Pat. No. 5,049,885, which is expressly incorporated herein by reference.

Figure 2:
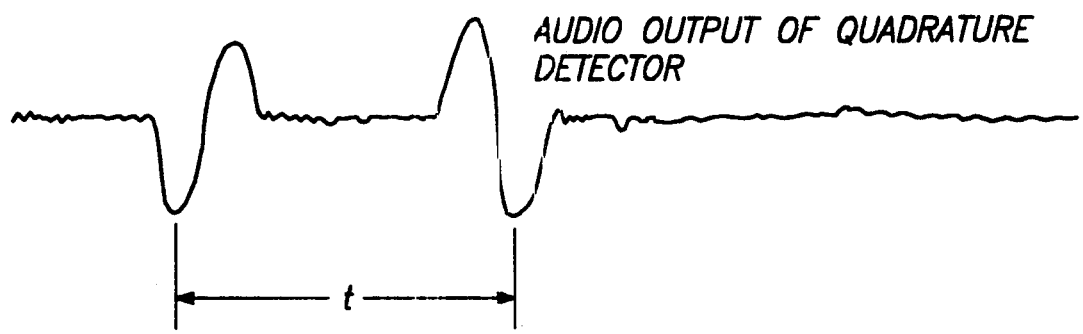
FIG. 2 is a graphical representation of a typical output s-curve from the quadrature detector portion of the present invention.

The output of the quadrature detector 34 is a pair of single cycle sine waves that are referred to herein a "s-curves" as shown in FIG. 2. As explained in U.S. Pat. No. 5,049,885, the s-curves define positions in time relative to the start of the sweep which correspond to the frequency at which the incoming signal is received. The first s-curve is related to the actual incoming signal, while the second s-curve is a result of an "image" of the imcoming signal which is created by the heterodyning receiver. When the sweeping signal is slightly above 10 MHz, the output of the quadrature detector 34 is a negative voltage. When the sweeping signal is slightly below 10 MHz, the output of the quadrature detector 34 is a positive voltage. When the sweeping signal is outside the bandwidth of the quadrature detector 34, no output signal is observed.

The time period t between the s-curves is a function of how fast the first local oscillator is sweeping, and of the frequency of the amplifier 30, filter 32, and quadrature detector 34. For example, if the first local oscillator 14 is sweeping a total of 120 MHz in 120 msec, then for X band signal the radar detector is sweeping 1 MHz/mS. Since the K band coverage is a second harmonic mix, the radar detector sweeps 240 MHz in 120 mS, i.e. 2 MHz/mS. The time spacing between s-curves can be determined by the following equation:

(sweep time × (2 × IF frequency) ÷ sweep width).

Thus, assuming a 120 MHz sweep time, the spacing for a valid signal of each type would be as follows:

$t_x = (120 \text{ ms} * (2 * 10 \text{ MHz}) \div 120 \text{ MHz}) = 20 \text{ ms};$ $t_k = (120 \text{ ms} * (2 * 10 \text{ MHz}) \div 240 \text{ MHz}) = 10 \text{ ms};$ $t_{Ka} = (120 \text{ ms} * (2 * 10 \text{ MHz}) \div 1200 \text{ MHz}) = 2 \text{ ms}.$ Therefore, absent the teaching of the present invention, a radar detector sensing a 2 ms time spacing between s-curves would generate an alert for a Ka band radar signal.

Figure 3:
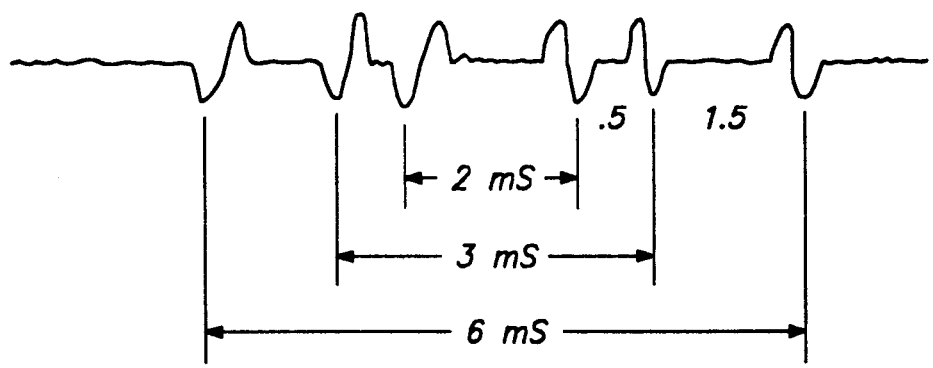
FIG. 3 is a graphical representation of the output from the quadrature detector portion of the present invention when an interfering radar source is received.

However, if the incoming signal is from an interfering source, i.e., another radar detector, then three pairs of s-curves will be generated as shown in FIG. 3, including one pair spaced at 2 ms, one pair spaced at 3 ms, and one pair spaced at 6 ms. The pair of s-curves spaced at 2 ms are due to the third harmonic of the signal from the first oscillator 14 mixing with the third harmonic of the signal received from the interfering radar detector. The pair of s-curves spaced at 3 ms are due to the second harmonic of the signal from the first oscillator 14 mixing with the second harmonic of the signal received from the interfering radar detector. The pair of s-curves spaced at 6 ms are due to the fundamental signal from the first oscillator 14 mixing with the fundamental signal received from the interfering radar detector.

For example, if the interfering radar detector has a fixed first local oscillator generating a signal at 11.559 GHz, then a second harmonic signal radiates at 23.118 GHz and a third harmonic signal radiates at 34.667 GHz. When the first oscillator 14 of the present invention sweeps through 11.549 GHz, an s-curve is generated due to the 10 MHz difference between the receiver and the interfering source:

(11.549 GHz − 11.559 GHz = 10 MHz).

When the first oscillator 14 of the present invention sweeps through 11.554 GHz, an s-curve is also generated due to the 10 MHz difference between the second harmonic mix of the receiver and the interfering source:

((11.554 GHz * 2) − 23.118 GHz = 10 MHz).

The same thing occurs at the third harmonic when the first oscillator 14 sweeps through 11.5557 GHz:

((11.5557 GHz * 3)34.677 GHz = 10 MHz).

Since conversion loss of a third harmonic mix will be greater than that of a fundamental or second harmonic mix, the responses of each type of mix will differ in amplitude. These responses can be easily seen by using a tuner in the antenna to reduce out fundamental radiation.

The use of signal processing techniques can thus be used to determine the difference between various responses in order to make a decision to alert for a valid signal, as will now be described in detail.

2. Digital Signal Processing of a Detected Signal.

Figure 4:
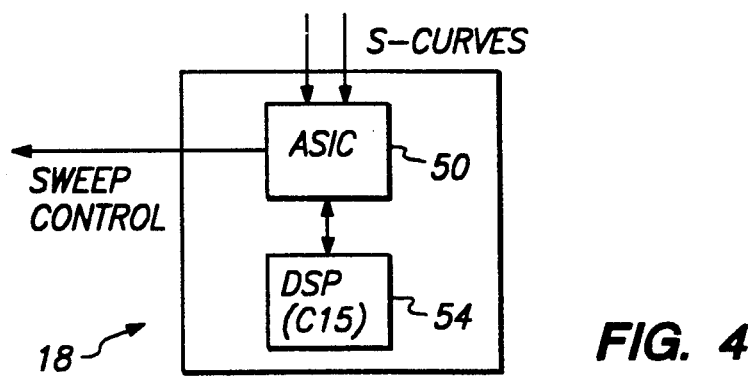
FIG. 4 is a block diagram of digital signal processing portion of the embodiment shown in FIG. 1.

Once an s-curve pair has been successfully detected by quadrature detector 34, it is presented to the microprocessor/DSP 18 for digital signal processing. As shown in FIG. 4, this portion of the invention is primarily centered on the idea of spliting the signal processing into two groups: high rate processing and low rate processing. In order to meet the throughput requirements, the high rate data reduction hardware is consolidated into an Application Specific Integrated Circuit ("ASIC") 50 using a classic pipelined architectural approach found in dedicated signal processing applications. In order to meet programmable needs, the ASIC 50 passes low rate data to a low cost programmable digital signal processing ("DSP") chip 54. The DSP chip 54 is programmed to collect low rate data, perform post processing, and report the results to the product user. Preferably, the DSP chip 54 is Texas Instruments' TMS320c15 chip (hereinafter referred to as the "c15").

A. High Rate Processing i. Pipelined Architecture using SWDFT

As stated above, the high rate processing section of the preferred embodiment includes an ASIC 50 which uses a pipelined architectural approach. A pipelined architecture refers to the arrangement in which calculations are performed in the process. The process is broken up into a series of calculations that are all performed in parallel in the pipeline. On each clock edge, the results of a given step are passed on to the next stage of the pipeline. This enables the hardware to achieve a throughput rate that is equal to the clock rate of the pipeline.

In Cincinnati Microwave, Inc.'s NEW ESCORT radar detector, a Motorola 56000 Digital Signal Processor chip was used for radar signal detection and processing. However, this product performed all processing setps sequentially. Thus, each time a new input was fed in, the Motorola 56000 devoted over 90 percent of its processing time to performing these menial calculations. As can be apprecitaed, the throughput of such a device is inadequate for timely wide Ka band processing.

The NEW ESCORT product did, however, take advantage of spectral processing techniques by measuring the spectral content of portions of output data from the FM demodulator collected during a sweep. A detection criterion was chosen to see if the amplitude of the s-curve component exceeded a threshold.

A numerically wasteful solution involves converting the FM demodulator data into a frequency domain equivalent using a Fourier Transform. The component of interest will appear as a single value in the Fourier Series. This value can then be taken from the Fourier Series and compared to a threshold. However, the s-curve is not present during the entire sweep. Also, the period of the s-curve grows with signal strength. Further, a Fourier Transform requires a substantial amount of processing. Therefore, it is not a suitable approach to the problem of wideband signal processing.

A better approach is based on measuring the spectral content of successive segments (or windows) of data from the sweep. The window size is chosen to be close to the period of the s-curve. The detection criterion is chosen to see if the amplitude of the fundamental component in successive windows exceeds a threshold. Each time a new sample is acquired from an A/D converter, the window can be updated. Updating is accomplished by incorporating the current sample point while eliminating the oldest sample point. This results in an effective shift of the window position so that it includes the N most recent points acquired during the sweep. The set of values in the window is converted into the frequency domain by a method such as the Fourier Transform. The component of interest can then be examined in each from successive windows.

A digital approximation to the continuous Fourier Transform is the Discrete Fourier Transform ("DFT"). The Fast Fourier Transform ("FFT") is a mathematically efficient method for finding the spectrum of a time series, however, it is less efficient than the DFT for calculating a single value within the spectrum. Thus, the DFT is suitable for the present application even though the period of the s-curve increases with signal strength. As a result, the algorithm can be simplified to the task of solving for the DFT of successive windows within the sweep. Each DFT calculation thus produces an output value corresponding to a single component found in its input window.

The DFT will hereinafter be represented by the expression H(n/NT) and may be determined according to the following equation:

$$H(n/NT) = T * \sum_{k=0}^{N-1} h(kT)e^{-j2\pi nk/N}$$

where
T = 1/sample rate
N = # points/period
n = the component of interest (e.g. 1 in the case of the fundamental frequency)

See E. Oran Brigham, "The Fast Fourier Transform," p.102, expression 6-24.

Since the present application involves calculating the DFT of a sliding window of time samples through the sweep, a little exploration of the DFT of a sliding time window reveals an interesting approach that drastically cuts the number of multiply and adds associated in the previous equation.

If the DFT of a window is known at time L, then the DFT for the adjacent window L+1 can be calculated from the DFT at window L with far fewer operations. This concept is expressed in the following expression and is known as the Sliding Window Discrete Fourier Transform ("SWDFT").

$$H_{L+1}(1/NT) = e^{j2\pi L/N} * H_L(1/NT) + h(LT) - h((L-N)T)$$

where
$H_{L+1}(1/NT)$ = the DFT of the L+1 window
$h(LT)$ = the next sample
$h((L-N)T)$ = the oldest sample in the window Using this equation, only one real by complex multiply and two real adds are involved per input sample. The set of operations is performed once per sample at the chosen sample rate.

Successive DFT calculations produce a set of complex values that are related to the fundamental energy content at consecutive points throughout the sweep.

ii. Structure of ASIC a. Generally

The following is a description of the structure of the ASIC that performs the SWDFT. Initially, it is important to note that to reduce product cost and parts count, all necessary digital circuit functions were absorbed into the ASIC. These additional functions include sound synthesis, LED control, and user interface.

The ASIC design began with an approach based on the method used in the NEW ESCORT product described earlier, which consisted of a circuit for performing the SWDFT, a low pass filter, and a decimator. The NEW ESCORT received its input data from a 6 bit A/D converter and used an 8k static RAM chip for storing 24 bit averaged values. Thus, the DSP had a 24 bit data bus with 48 bit accumulators.

According to a preferred embodiment of the present invention, a 2 bit window comparator circuit is designed to output binary code (0,0) if the signal value is within a window of +/−k, binary code (0,1) if the signal value is greater than +k, and binary code (1,0) if the signal value is less than −k. (Since only 3 of the 4 states available in 2 bits are used, the A/D is actually not a 2 bit A/D, but rather log2(3) or 1.58 bits). The value for k is set by analog means, and is rather critical. If it is too large, subtle features in the sweep signal are not passed to the digital process. If too small, signal noise is exaggerated. The value for k is a function of the signal amplifier gain. The gain is adjusted by maximizing the separation between signal and noise when a weak signal is present.

The benefit of reducing the number of bits of input data significantly reduces wordlengths in the remaining steps in the process. The 2 bit input value is passed into a circuit that calculates the SWDFT. This involves accumulating the complex product of the difference between the next input and the input that was received N points previously.

The N point delay is accomplished with a shift register. Each input is fed into a shift register that is 128 points (by 2 bits) deep.

b. Hardware Description Language

The present invention utilized optimized models which were converted into hardware via a software programmable logic such as Altera's Hardware Description Language ("HDL"). Various working hardware configurations were tested with microwave receivers until a final design was reached.

The shift register has been realized with the following HDL statements.

| | |
|---|---|
| lshift1 = newbit0; | Least significant bit of input |
| lshift[127 . . . 2] = lshift[126 . . . 1]; | |
| hshift1 = newbit1; | Most Significant bit of input |
| hshift[127 . . . 2] = hshift[126 . . . 1]; | |

Here, the vector lshift is used to carry the least significant bit of the input from the window comparator and hshift is used to carry the most significant bit.

The value N is the number of points in the window size for the SWDFT. A larger value for N produces a more accurate DFT measurement and also increases the dynamic range of the output of the SWDFT stage. The larger the dynamic range, the greater the number of bits required in downstream processing. Practical values were shown to be 32, 64, and 128. Design generality has been achieved by providing a method for the host processor (the c15) to choose one of these 3 values through a control port. This port is described in more detail below in the section entitled "Out 0: DSP Pipe Processing Setup." The following HDL expressions produce output signals (dhigh,dlow) that represent the shift register output with processor directed delay.

```
dlow  = (lshift127 & (ippd[ ] = 1)) #
        (lshift63  & (ippd[ ] = 2)) #
        (lshift31  & (ippd[ ] = 3));
dhigh = (hshift127 & (ippd[ ] = 1)) #
        (hshift63  & (ippd[ ] = 2)) #
        (hshift31  & (ippd[ ] = 3));
```

The vector ippd[] is the processor delay register and determines the tap selection.

The four signals needed for the delay calculation are defined as the new input pair (newbit1, newbit0) and the old input pair (dhigh, dlow). The SWDFT utilizes the difference between these vectors. There are nine possibilities for this solution, as shown in the HDL truth table presented in TABLE 1.

The difference is shown to the right of the => and is presented with the output name dif[]. Note that dif[] is a 3 bit quantity that can take on five possible values, namely −2, −1, 0, 1, 2.

In the far right column, the same calculations are shown within comment marks (%—%) in base 10.

TABLE 1

```
TABLE;
newbit1,newbit0,dhigh,dlow = >dif[ ];
0,0,0,0    =>   0,0,0    ;   % 0 = 0 − 0%
0,0,0,1    =>   1,1,1    ;   % −1 = 0 − 1%
0,0,1,0    =>   0,0,1    ;   % +1 = 0 − −1%
0,1,0,0    =>   0,0,1    ;   % +1 = 1 − 0%
0,1,0,1    =>   0,0,0    ;   % 0 = 1 − 1%
0,1,1,0    =>   0,1,0    ;   % +2 = 1 − −1%
1,0,0,0    =>   1,1,1    ;   % −1 = −1 − 0%
1,0,0,1    =>   1,1,0    ;   % −2 = −1 − 1%
1,0,1,0    =>   0,0,0    ;   % 0 = −1 − −1%
END TABLE;
```

The remaining design of the SWDFT requires that the difference dif[] be multiplied by the complex basis $e^{(j*2pi*L/N)}$ as given previously. The complex product is followed by a complex accumulator.

The basis is synthesized by connecting a counter to a lookup table. The counter addr is synthesized by the simple statement:

$$addr[] = addr[] + (0,0,0,0,1);$$

A 5-bit cosine ROM is realized by the HDL code shown in TABLE 2.

TABLE 2

```
TABLE;
        romaddr[ ] => cos[ ];
        0  => 7;
        1  => 7;
        2  => 6;
        3  => 5;
        4  => 4;
        5  => 3;
        6  => 2;
        7  => 1;
        8  => 15;
        9  => 14;
        10 => 13;
        11 => 12;
        12 => 11;
        13 => 10;
        14 => 9;
        15 => 9;
END TABLE;
```

Adding an offset of (0,1,0,0,0) to the input in romaddr[] produces an address of the quadrature component needed for the imaginary element of the complex basis. The correct sign of the product of the ROM content cos[] and difference value dif[] is incorporated by adding the second term (dif2,0,0,0,0). Since the table only generates the first 180 degrees of the cos function, the remaining half must be synthesized. The remaining half is produced by performing an "exclusive or" operation on the vector raddr[6..3] with raddr7 in the following line. The table has been rotated by 2*pi/16/2 to produce a natural symmetry. The second expression produces the actual vector used to address the previously defined ROM table, romaddr[].

$$raddr[4 \ldots 0] = addr[4 \ldots 0] + (dif2,0,0,0,0) + (0,real/imag,0,0,0)$$
$$romaddr[\,] = raddr[3 \ldots 0] \,\$\, raddr4$$

where $ is the 'xor' function.

The element real/imag is either a 0 or 1 depending on whether the lookup value is to be the real or imaginary part of the basis function. To reduce the complexity of the ASIC design, the real and imaginary parts of the product are calculated in two separate phases of an internal clock. This eliminates the need for two separate lookup tables and multiplier circuits. Only two separate registers are actually used to contain the real and imaginary parts of the complex product. These registers are fed by a common multiplier and accumulator circuit.

The following expression generates the real or imaginary part of the product in t[] by taking advantage of the minimal set of values of dif[]. Since the magnitude of dif[] can only equal 0, 1, or 2, the following and/or expression will produce the product of dif[] and the ROM output values. The repeating references to cos3 produce the two's complement sign extension needed for accumulating an 11 bit sum.

t[] = *di*/0 & (cos3,cos3,cos3,cos3,
    cos3,cos3,cos3,cos[3..0]) #*di*/1 &
    (cos3,cos3,cos3,cos3, cos3,cos3,cos[3..0],0);

As explained, the arithmetic section is designed to perform a two cycle process. In the final design, the imaginary calculation is computed first while real-/imag=1 followed by the real calculation with real-/imag=0. "Adda" is an 11 bit adder that adds the output of the multiplexer to the real or imaginary product. The result is written back into registers rsum or isum.

adda.a[ ] = t[ ]
adda.b[ ] = mpxa[ ]
rsum[ ] = ((sum[ ] & !real/imag)#(rsum[ ] &
    real/imag));
isum[ ] = ((sum[ ] & real/imag)#(isum[ ] &
    !real/imag));
mpxa[ ] = ((!real/imag & rsum[ ]) (real/imag &
    isum[ ]));

The final values in rsum and isum are passed on to the host processor in the following HDL expressions.

dout[7 . . . 0]=(mpxa[10 . . . 3] & ((ippd[ ]==1))
    # (mpxa[9 . . . 2] & (ippd[ ]==2))
    # (mpxa[8 . . . 1] & (ippd[ ]==3));

The register 1ippd[]' is preloaded by the host processor and determines which region of the resulting sum to pass back when the data is read. When the number of points per period is changed, the precision of the result is improved by using different regions of the data path 'mpxa[].' For example, the smallest window set is optimized by using a higher precision region shown as 'mpxa[8..1].'

The concept of decimation is inherently simple in this setting. Decimation is accomplished by changing the rate at which the processor reads the data 'dout[].'

Handshaking logic in the ASIC determines when decimated value are available.

The actual HDL design for the signal processor, is somewhat different than the sample expressions just supplied. Since the design was prototyped across several programmable devices, these design files are partitioned to reduce the number of devices required in the design. Other differences take the best advantage of pre-existing 'macros' that are efficiently implemented in the programmable devices used. All of the resulting HDL code becomes device independent when it is converted into the EDIF format for ASIC design.

c. ASIC Interfacing Design

The ASIC has been designed to interface with Texas Instruments 320c15 DSP chip. The ASIC interfaces to both processors through 8 data lines, 3 address lines, and 2 status lines. The ASIC provides optional support for an 8k×8 RAM. These features provide hardware for averaging as needed in a higher sensitivity product.

The ASIC will support the features in TABLE 3.

TABLE 3

Figure 5A:
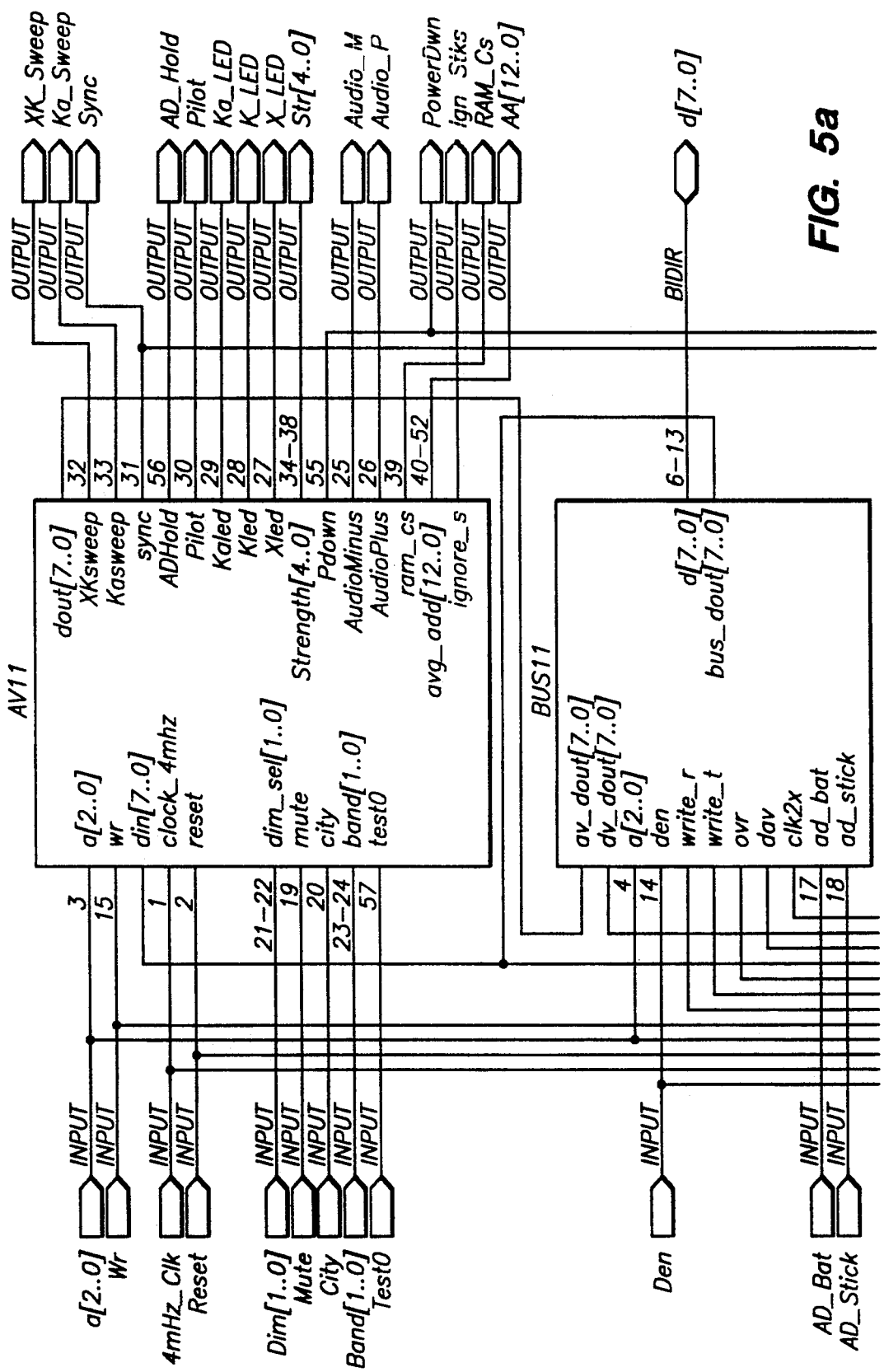
FIG. 5 shows the interconnections within a programmable prototype of the ASIC portion of the embodiment shown in FIG. 2.

1) 5 Signal Strength LEDs
2) 1 Pilot
3) 3 alert LEDs indicating band
4) Sound generation
5) Microwave Receiver control
6) Stick magnitude
7) Battery level & Power management
8) Averaging Memory Management
9) User switch support
10) Digital Signal Processing The ASIC interconnects with the other components in the radar detector through 64 pins. These pins are itemized in TABLE 4 by product type and shown in FIG. 5.

TABLE 4

| | | Pin Utilization by Product Category | | | | |
|---|---|---|---|---|---|---|
| pin # | 68hc05p7 Narrow Signal Name | 320c15 Wide S23 | C23 | C31 | C32 | Description |
| 1. | k4inhz | X | X | X | X | Clock |
| 2. | reset | X | X | X | X | Power on Reset |
| 3. | a0 | X | X | X | X | Host Processor |
| 4. | a1 | X | X | X | X | Address |
| 5. | a2 | X | X | X | X | Lines |
| 6. | d0 | X | X | X | X | |
| 7. | d1 | X | X | X | X | Host |
| 8. | d2 | X | X | X | X | Processor |
| 9. | d3 | X | X | X | X | Bidirectional |
| 10. | d4 | X | X | X | X | Data |
| 11. | d5 | X | X | X | X | Lines |
| 12. | d6 | X | X | X | X | |
| 13. | d7 | X | X | X | X | |
| 14. | den | X | X | X | X | ASIC Out Enable |
| 15. | wr | X | X | X | X | ASIC In Enable |
| 16. | AD_Dump | X | X | X | X | Sample Hold |
| 17. | ad_bat | X | — | — | — | Battery Compare |
| 18. | ad_stick | X | X | X | X | Stick compare |
| 19. | mute | X | X | X | X | Mute Switch |
| 20. | city | X | X | X | X | City Switch |
| 21. | dim_sel0 | X | X | X | X | Dim Selection 1 |
| 22. | dim_sel1 | X | X | X | X | DimSelection2 |
| 23. | band0 | — | — | X | X | Band Select 1 |
| 24. | ms_band1 | X | — | X | X | B Sel2&MotionSns |
| 25. | AudioMinus | X | X | X | X | Audio |
| 26. | AudioPlus | X | X | X | X | Audio |
| 27. | Xled | X | X | — | X | X-BandLED |
| 28. | Kled | X | X | — | X | K-BandLED |
| 29. | Kaled | — | — | — | X | Ka-BandLED |
| 30. | Pilot | X | X | X | X | Pilot LED |
| 31. | sync | X | X | X | X | Sweep Reset |
| 32. | XKSweep | X | — | X | X | High during X/K |

TABLE 4-continued

| | | Pin Utilization by Product Category | | | | |
|---|---|---|---|---|---|---|
| pin # | 68hc05p7 Narrow Signal Name | 320c15 Wide S23 | C23 | C31 | C32 | Description |
| 33. | Kasweep | — | — | X | X | High during Ka |
| 34. | Strength0 | X | X | X | X | Signal |
| 35. | Strength1 | X | X | X | X | Strength |
| 36. | Strength2 | X | X | X | X | LED's |
| 37. | Strength3 | X | X | — | X | |
| 38. | Strength4 | X | X | — | X | |
| 39. | ram_cs | — | X | X | X | RamCS |
| 40. | avg_adr0 | X | X | X | X | |
| 41. | avg_adr1 | X | X | X | X | |
| 42. | avg_adr2 | X | X | X | X | |
| 43. | avg_adr3 | X | X | X | X | |
| 44. | avg_adr4 | X | X | X | X | Averaging |
| 45. | avg_adr5 | — | X | X | X | Memory |
| 46. | avg_adr6 | — | X | X | X | Address |
| 47. | avg_adr7 | — | X | X | X | |
| 48. | avg_adr8 | — | X | X | X | (Low5provide |
| 49. | avg_adr9 | — | X | X | X | D/A Conversion |
| 50. | avg_adr10 | — | X | X | X | Support) |
| 51. | avg_adr11 | — | X | X | X | |
| 52. | avg_adr12 | — | X | X | X | |
| 53. | cpr0 | X | X | X | X | Inputs from 2 |
| 54. | cpr1 | X | X | X | X | bit A/D ckt |
| 55. | PowerDwn | X | — | — | — | Power Duty Cycle |
| 56. | AD_Hold | X | X | X | X | SampleHold |
| 57. | test0 | — | — | — | — | Test |
| 58. | jumper0 | X | X | X | X | Jumper Input 2 |
| 59. | jumper1 | X | X | X | X | Jumper Input 1 |
| 60. | poff | X | — | — | — | Power Off |
| 61. | vcc | X | X | X | X | |
| 62. | vcc | X | X | X | X | +5 v |
| 63. | gnd | X | X | X | X | Power Supply |
| 64. | gnd | X | X | X | X | |

"X" denotes use of pin in designated product and "—" denotes nonuse of pin in designated product.

Control is managed by the host processor through an 8 bit data bus. Three address lines offer 8 independent input/output locations within the ASIC for setup and control. Two status lines will determine whether data is being read from or written to each of 8 input or 8 output locations. These 8 locations are itemized in TABLE 5. The test0 input is used for vendor test of the ASIC (speeds up A/V functions by a factor of 25.)

TABLE 5

DSP/uP Output Location Breakdown

| dsp_set | = 0 | ; %DSP Pipe processing setup | % |
|---|---|---|---|
| receiver | = 1 | ; %Microwave Sweep Control | % |
| ram_out | = 2 | ; %Write 8kram&incrcntr | % |
| caddr | = 3 | ; %Miscellaneous Control bits | % |
| led | = 4 | ; %LED's | % |
| sound | = 5 | ; %Sound Selection & Intensity | % |
| beprate | = 6 | ; %Beep Rate | % |
| diagout | = 7 | ; %Diagnostic Serial Register | % |

DSP/uP Input Location Breakdown

| rreal | = 0 | ; %Read real | % |
|---|---|---|---|
| rimag | = 1 | ; %Read imaginary | % |
| ram_in | = 2 | ; %Read 8k averaging ram | % |
| status | = 3 | ; %Switches & Status | % |
| clocks | = 4 | ; %Timebase | % |
| pipestat | = 5 | ; %Data Pipe Status:DAV&Overrun | % |
| a_d | = 6 | ; %A/D input bits | % |
| diagin | = 7 | ; %Diagnostic Switch Register | % |

Out 0: DSP Pipe Processing Setup

This output register sets up all parameters related to the signal processing algorithm used for signal detection. The algorithm is a scaled down version of the technique used in the "New Escort". The ASIC contains an arithmetic pipeline that performs the algorithm at a selectable clock rate.

The operations involve complex arithmetic and require two steps per input point. Due to the similarity of the real and imaginary steps, the pipe structure has been simplified into a two step process. The real calculation is performed on the rising edge of the clock. The imaginary calculation is performed on the falling edge of the clock.

There are three factors, listed in TABLE 6, that establish the optimal detection frequency. They are chosen to produce a peak output for a designated s-curve frequency.

TABLE 6

| 1. | Clock Frequency | [3 ... 0]* | divider |
|---|---|---|---|
| 2. | Input Points/Period | [7 ... 6] | ippd |
| 3. | Output Points/Period | [5 ... 4] | oppd |

*This notation has been taken from Altera's design tools and indicates the bits associated with the designated function. [3 ... 0] refers to bit numbers 0, 1, 2, & 3. Bit 3 is considered the most significant.

These 3 parameters can be selected by loading an 8 bit value into port 0. Since the frequency of the s-curve will change depending on whether the sweep is an X/K band or a Ka band, these parameters will be changed by the host processor as it alternates between these two sweep types. The indicated fields select choices from the following TABLEs 8-9.

TABLE 7

| Value for 'ippd' | Input Points/Period |
|---|---|
| 0 | 128 |
| 1 | 128 |
| 2 | 64 |
| 3 | 32 |

TABLE 8

| Value for 'oppd' | Output Points/Period |
| --- | --- |
| 0 | 32 |
| 1 | 16 |
| 2 | 8 |
| 3 | 4 |

Control words ippd and oppd establish tradeoffs between sensitivity, throughput, storage requirements, and s-curve Center Frequency. Higher points/period choices offer greater sensitivities but result in higher data rates into the host processor. Furthermore, if the processor is averaging the data, larger amounts of memory will be required to contain the results.

The clock frequency for this ASIC must be set to 4 mHz. This is necessary because it is used as the master time base for all sound generation. The pitches of these sounds are all tied to the 4 mHz clock.

Given the 4 mHz time base, the final four bit field in the DSP setup register determines the division quotient from which the sample rate is determined. The hardware produces a sample rate clock that can be found from the following expression:

Sample Rate = (4 mHz)/(4 *x + 4)
where x = 4 bit field in setup register

TABLE 9 shows all of the optimal s-curve frequencies given the clock divider and the value for ippd.

TABLE 9

| Clock Divider Selection | Data Sample Rate | ippd=3 | ippd=2 | ippd=1 |
| --- | --- | --- | --- | --- |
| | | Optimal S Curve Frequency | | |
| 0 | 2.00 mHz | 31.3 kHz | 5.6 kHz | 7.8 kHz |
| 1 | 500.0 kHz | 15.6 kHz | 7.8 kHz | 3.9 kHz |
| 2 | 333.3 kHz | 10.4 kHz | 5.2 kHz | 2.6 kHz |
| 3 | 250.0 kHz | 7.8 kHz | 3.9 kHz | 2.0 kHz |
| 4 | 200.0 kHz | 6.3 kHz | 3.1 kHz | 1.6 kHz |
| 5 | 166.7 kHz | 5.2 kHz | 2.6 kHz | 1.3 kHz |
| 6 | 142.9 kHz | 4.5 kHz | 2.2 kHz | 1.1 kHz |
| 7 | 125.0 kHz | 3.9 kHz | 2.0 kHz | 976.6 Hz |
| 8 | 111.1 kHz | 3.5 kHz | 1.7 kHz | 868.1 Hz |
| 9 | 100.0 kHz | 3.1 kHz | 1.6 kHz | 781.3 Hz |
| 10 | 90.9 kHz | 2.8 kHz | 1.4 kHz | 710.2 Hz |
| 11 | 83.3 kHz | 2.6 kHz | 1.3 kHz | 651.0 Hz |
| 12 | 76.9 kHz | 2.4 kHz | 1.2 kHz | 601.0 Hz |
| 13 | 71.4 kHz | 2.2 kHz | 1.1 kHz | 558.0 Hz |
| 14 | 66.7 kHz | 2.1 kHz | 1.0 kHz | 520.8 Hz |
| 15 | 62.5 kHz | 2.0 kHz | 976.6 Hz | 488.3 Hz |

The value for 'oppd' can range from 4 to 32 and sets the tradeoff between the number of points in the output array and the line spacing in this array. If energy is centered directly between two of these lines the numeric process will result in the energy 'leaking' into each of them with reduced amplitude. This loss in amplitude reduces sensitivity and can be minimized by maintaining the largest possible value for oppd. For oppd=4, the worst case amplitude reduction is 1/sqr(2).

Given sweep periods of 125 mS for wide band and 50 mS for narrow band, and the 4 mHz clock frequency, TABLE 10 has been constructed based on a suggested setup configuration.

TABLE 10

| Parameter | Wide | Narrow |
| --- | --- | --- |
| Input Clock Frequency | 4.00 mHz | 4.00 mHz |
| Sweep Period | 125.00 mS | 50.00 mS |
| Sweep Frequency | 8.0 Hz | 20.0 Hz |

TABLE 10-continued

| Parameter | Wide | Narrow |
| --- | --- | --- |
| Lead clock divider | 1 | 2 Divider |
| Sample Rate | 500.0 kHz | 333.3 kHz |
| Points/Period | 64 | 128 IPPD: 2,1 |
| Ideal x/s-curve Freq | 12.0 kHz | 3.0 kHz |
| Actual x/s-curve Freq | 7.8 kHz | 2.6 kHz |
| Peak detected point/prd | 4 | 4 OPPD: 3,3 |
| Processor data rate | 31.3 kHz | 10.4 kHz |
| Processor data period | 32.00 uS | 96.00 uS |
| Decimation Rate | 16 | 32 |
| Points/Sweep | 3906 | 521 |
| Instructions/uSec | 4 | 4 |
| Instruction/Input Point | 128 | 384 |

Note that the total number of points in both sweeps is 3906+521. This is complex data and will require a total of 8854 locations of 8 bit memory for storage. With the hope of holding the memory size to 8k, the data must be 'compressed' and 'decompressed' during the sweep.

The sweep frequencies in the previous table are based on the assumption that there are no multiple sweeps. Since the wide band units will involve both narrow and wide band sweeps, the final sweep frequencies will be less than the indicated values. These differences will not effect the other entries in these tables. The values indicated for instructions/input point are based on the use of the 320c15 processor running at 16 mHz. These numbers are critical because they determine the largest program size that can support the selected data rate. If the program size exceeds these values, some points that are produced during the sweep will be missed. This situation would be unacceptable and is called an 'overrun.' If an overrun occurs, it can be detected during the software development process via a bit in one of the status registers that will be described shortly.

The 320c15 processor can be clocked at a higher rate than 16 mHz. The 16 mHz rate was chosen because at this frequency, the c15's 'Clkout' pin will be 16/4 or 4 mHz. 4 mHz is also the clock frequency planned for the 68hc05p7. Both design scenarios provide a 4 mHz clock that can be used as the ASIC clock source.

Out 1: Microwave Sweet Control

This port controls the receiver as well as a number of other functions. The 8 bit location is broken down in TABLE 11.

TABLE 11

| [0]: X/K Sweep | (Low during X/K sweep) |
| --- | --- |
| [1]: KaSweep | (Low during Ka sweep) |
| [2]: Sweep Reset | (Low during sweep) |
| [3]: A/D Sample Hold | (Low to hold) |
| [4]: Power Down | (High to power down to standby mode) |
| [5]: Pilot Light | (Active low) (High bit=on) |
| [6]: Pilot Blink EN | (Blinks Pilot Indicator if high) |
| [7]: Soft Reset | (Resets active high) |

Bits 0 and 1 must be set low by the host during the indicated sweeps. Bit 2, the sweep reset, must be set high between sweep times (Bit 2 is set high on powerup). The sample hold bit (bit 3) is set low to fix the input to a comparator which is used in a software assisted A/D converter. The other input to the A/D is a D/A formed from a counter and a resistor network.

If Bit 4 is set high, the power consumption of the part is reduced to a minimum. The internal clocks to the DSP section are gated off. The signal also generates an output to power off external analog circuitry in the radio.

Bit 5 will be set high to enable the pilot light. If bit 6 is set, the pilot will blink on once per second (for 128 mS.) This is used to indicate a low battery condition. The pilot light is multiplexed in the same manner that the signal strength LED's are multiplexed. It is given a 50% on-time as opposed to the 12.5% slice given to the signal strength and alert LED's.

Bit 7 powers up in the active state and holds the ASIC in the reset condition until cleared by the host processor. At any time, the processor can set this bit to put the ASIC back into the reset condition.

Out 2: Writes to ram

For the most part, this operation is unassisted by the ASIC since it does not contain RAM memory. The ASIC does play a secondary roll in this effort. The RAM is addressed by an internal 12 bit counter. At the conclusion of a RAM write operation, the ASIC increments this address counter.

Out 3: Miscellaneous Control Bits

This port controls the averaging counter and a portion of the analog peak detection circuit. The 8 bit location is broken down in TABLE 12.

TABLE 12

| | |
|---|---|
| [0]: | Clears Address Counter asynchronously if high |
| [1]: | Enable up or down count on RAM write if high |
| [2]: | Count up if low or down if high |
| [3]: | Reset A/D circuit if high |
| [4]: | Mute Audio if low |
| [5]: | Power off radio if high |
| [6]: | Reset Motion Sense and Mute Latches if low |
| [7]: | Blink Alert LEDs with Audio if high |

Out 4: LED Display

Bit 0 is set high on power up, the counter bits are cleared. When using bit 0 to clear the counter, bit 2 must be low. The motion sense input is sampled and checked for transitions in the ASIC. The motion sense latch is set if transitions have occurred. The mute input is a latched input. Bit 6 low resets the motion sense and mute latches. Bit 7 high causes the 3 band alert LEDs to blink with the Audio beeps (if the LED's are on.)

This register provides a method for independent control of all LED's attached to the ASIC. There are no prearranged display options. Any or all of these LED's can be turned on at any time. Software design will expect the left most or most significant LED in the signal strength LED group set to be the highest order bit number.

The host processor will execute different support programs depending on the product it is in. One of the differences between these programs will be in the number of LED's of signal strength displayed. The support processor will test external jumpers to determine which variation of the program to execute. These jumpers are read through input port 3.

Each of the 8 LED's will be multiplexed on during ⅛ of the total time. This approach conserves power and increases the perceived brightness of the display. All of these LED outputs, shown in TABLE 13, are active low.

TABLE 13

| | |
|---|---|
| [4 ... 0]: | Signal Strength Meter |

TABLE 13-continued

| | |
|---|---|
| [5]: | X Band Alert |
| [6]: | K Band Alert |
| [7]: | Ka Band Alert |

Out 5: Sound & Display Intensity

Port 5 is used to specify the alert sound type. Bits [2..0] identify the selection. TABLE 14 contains the eight sound options and their [2..0] code. If a sound is initiated following a 'quiet' selection, a full 64 mS tone 'on' time will be heard. The 'double brap' and 'double bing' sounds exceed the 64 mS standard tone interval. The siren is a continuous tone.

TABLE 14

| [2 ... 0] Sound Selection Register | | |
|---|---|---|
| quiet1 | 0; | %No sound & resets beeper ckt |
| quiet2 | 1; | %No sound |
| beep | 2; | %X-Band |
| brap | 3; | %K-Band |
| bing | 4; | %Bing |
| dbing | 5; | %DoubleBing |
| siren | 6; | %Siren |
| bark | 7; | %Ka-Band double brap |

The audio output is 'push pull' and is non overlapping. Two output pins are provided for this function.

The display intensity is user selectable via a three position 'dim' switch. The dim switch will be wired so that the two inputs to the ASIC take on the states indicated in TABLE 15.

TABLE 15

| Display Condition | Dim Sel 1 | Dim Sel 0 |
|---|---|---|
| Display Off | 0 | 1 |
| Low Intensity | 1 | 1 |
| Display On | 1 | 0 |
| Display On | 0 | 0 |

Since the intensity level of the 'Low Intensity' position will probably need to be adjusted after the ASIC design has been frozen, this value will be provided by the host processor via bits [7..3]. This approach offers an option for future products to use a photocell if needed. The photocell would be examined by the processor in pseudo-real time and a suitable value would be loaded into this intensity register. 32 intensities are available with 0 for brightest and 31 for off.

Out 6: Beep Rate Register

This port is used to specify the sound rate. The rate can be calculated from TABLE 16.

TABLE 16

| [7 ... 0] | | |
|---|---|---|
| [7 ... 0]: | 0: | Solid Tone |
| [7 ... 0]: | n: | (16 mS* (n+3)) Period Tone |
| [7 ... 0]: | 254: | Lowest period of 4.112 Sec |

The power up condition of this register is 255 which gives the same period as 254. For beep, brap, and bing, the minimum value of 3 yields a maximum beep rate of 10.42 Hz. For bark, the minimum value of 7 yields a maximum beep rate of 6.25 Hz.

Out 7: Diagnostic Serial Register

The ASIC will not provide any support for the Hyperception serial interface. The Hyperception serial interface is used as a display of the real time process sweep data. It will, however, leave this register location undisturbed so that an external interface can provide this type of support. This capability has not been integrated into this ASIC in order to reducee the gate count. Test fixturing will now require a 14 wire interface to provide this function. The interface will synchronously transfer a 16 bit quantity to another processor equipped to receive it. This method is used to produce the Hyperception display. The 16 bit quantity is established by writing two 8 bit values. Programmable logic in the test fixture will accept the two 8 bit values and transfer them after the 2nd 8 bit value has been loaded. The sync line will be used to establish the byte order for the first transfer.

The two writes are summarized as follows:
[7..0]: First 'Write' loads data into low 8 bits
[7..0]: Next 'Write' loads high 8 & initiates transfer

In 0: Reads Real Pipe Output

After the sync line bit is dropped (port 1 bit 2), the data processing pipe starts to pass usable data to the host. As data values are generated, they are made available in two 8 bit registers. The host processor can read these values at any time without disturbing the arithmetic activity of the pipeline. Reading location 0 provides the real part of the pipe output.

The processor can determine when new data is available by examining port 5 bit 0, a signal called 'DAV.' When this bit is high, data is available in both the real and imaginary registers. The DAV bit will remain high until the imaginary register is read. If the imaginary register is read before the real register, the DAV line will drop before the real register is read. Either approach is acceptable.

In 1: Reads Imaginary Pipe Output

This port contains the imaginary part of the pipeline output. Its behavior is identical to that of the real part. The real and imaginary parts are both necessary to support the complex averaging operation. Averaging is handled by the host processor. The rate at which data becomes available in the real and imaginary registers is determined by taking the sample rate and multiplying by the ratio of oppd/ippd. This ratio is called the decimation rate.

In 2: Reads currently addressed ram location

This operation is unassisted by the ASIC since it does not contain RAM memory. The ASIC does play a small roll in supporting the read RAM by producing the RAM Chip Select signal when a write to this port location is recognized. At the conclusion of a RAM read operation, the ASIC does not increment/decrement the address counter. The address counter is only incremented/decremented when a RAM write operation occurs. This approach facilitates a convenient method for averaging in which a value is read, modified, and overwritten during the sweep.

TABLE 17

| In 3: Reads panel switches/status | |
|---|---|
| [0]: | Jumper 0 |
| [1]: | Jumper 1 |
| [2]: | City (High if in City) |
| [3]: | Mute (High if Momentary Mute Occurred) |
| [5 ... 4]: | Dim (Indicate 1 of 3 dim settings) |

TABLE 17-continued

| In 3: Reads panel switches/status | |
|---|---|
| [7 ... 6]: | Band Selection (Indicate 1 of 3 options) |

This location provides status on switch settings. Bit 2 is active if the city mode is in the city position. Bit 3 will be high if the user has depressed the mute button. It is cleared by writing to 'out 3' with bit 6 low. The actual muting of audio is controlled by a bit in out 3. This approach makes it possible for the processor to delay the termination of the mute interval to meet the product specification.

Bit [1..0] are used to read the state of the external jumpers. This is used to determine which variation of the software to use with this radio.

Bits [5..4] reflect the user's dim selection to the host processor. This is for diagnostic purposes and has no operational purpose at this time.

Bits [7..6] provide the band selection information. The host processor will interpret the two input pins 'Band Sel 1' and 'Band Sel 2' to the ASIC according to TABLE 18.

TABLE 18

| Bands Selected | Band Sel1 | Band Sel0 |
|---|---|---|
| X,K, & Ka Wide | 0 | 1 |
| X,K, & Ka Narrow | 1 | 1 |
| X,K, & No Ka | 1 | 0 |
| X,K, & No Ka | 0 | 0 |

In 4: Comparator & Timer Bits

These bits are driven directly from selected taps in the counter chain and provide convenient methods for timing software events.

TABLE 19

| [0]: | .98 Hz Square Wave |
|---|---|
| [1]: | 1.95 Hz Square Wave |
| [2]: | 3.91 Hz Square Wave |
| [3]: | 7.81 Hz Square Wave |
| [4]: | 15.63 Hz Square Wave |
| [5]: | 31.25 Hz Square Wave |
| [6]: | 62.5 Hz Square Wave |
| [7]: | 125 Hz Square Wave |

In 5: Arithmetic Pipe Status

The data available bit 'DAV' appears in Bit location 0. It is high when real and imaginary data values are available in the output registers of the arithmetic pipeline. It appears low after the imaginary port has been read. Bit 1 is for software development purposes only and identifies a situation in which data is not being read from output registers 'real' and 'imaginary' quickly enough to meet the data rate requirements. 'Overrun' will remain set until the sweep sync is set high by the processor.

[0]: Data Available in real & imaginary registers
[1]: Overrun: Data not read before new values overwritten

In 6: Reads A/D Support

Two of these bits provide comparator status for A/D conversion. One bit is used to read the magnitude of the maximum Stick value. The second bit is used to read the battery level. Bit 2 is used to read the motion sense latch. It is set when transitions occur on the 'ms_band1' input. The latch is cleared through writing to 'out 3' with bit 6 low.

- [0]: A/D Comparator from Stick signal
- [1]: A/D Comparator from Battery signal
- [2]: Motion Sense Latch (High if motion has occurred.)

In 7: Diagnostic Input Register

The ASIC will not provide any support for the Hyperception Diagnostic interface. It will, however, leave this register location undisturbed so that an external interface can provide this type of support. This capability has not been integrated into this ASIC in order to e the gate count. Test fixturing will now require a 14 wire interface to provide this function. The interface will provide an 8-bit port that will be used for software development and manufacturing test purposes.

3. Post Processing

A. Generally

As stated previously, low rate post processing is performed in a DSP chip 54 such as the c15. The c15 is expected to handle all of the wideband discrimination processing. By using the c15 for post processing, the creation of new product features is relegated to a software design process. The approach preserves all of the advantages that software brings to the optimization process. Software methods can be applied to the key product requirement of rejecting interfering radar detectors.

As detailed above, the ASIC 50 is designed to accommodate a range of S-curve frequencies and sweep periods. The ASIC 50 is tuned to a particular s-curve frequency via a single control value from the c15 host processor 54. A simple program can be constructed that prescribes the best ASIC control value for a give s-curve frequency. Many tradeoffs must be considered. For example a short sweep period will result in good response times but poor sensitivities. Larger sweep periods reverse these conditions.

The ASIC was designed to operated from a 4 mHZ clock. TABLE 20 below was constructed for two types of data collection sweeps. The Ka band sweep parameters are shown in the first column. The X and K band sweep parameters are shown in the second column. The clock (item #1) can be divided by integer multiples selected by item 4 to produce a range of data acquisition rates. Two other parameters, "input points/period" in item #7 and "peak detected points/period" in item #9, establish the remaining parameters in TABLE 20. The measured ideal s-curve frequency for a 125 mS Ka Band s-curve is approximately 5.6 kHZ (item #7). The chosen control parameters for the ASIC result in a 5.2 kHZ Ka Band optimization.

TABLE 20

| | KaBand | X/K Band |
|---|---|---|
| 1 Input Clock Frequency | 4.00 mHZ | 4.00 mHZ |
| 2 Sweep Period | 125.00 mS | 50.00 mS |
| 3 Sweep Frequency | 8.0 Hz | 20.0 Hz |
| 4 Relative Lead clock divider | 2 | 3 |
| 5 Sample Rate | 333.3 kHz | 250.0 kHz |
| 6 points/Period | 64 | 128 |
| 7 Idealx/s-curve Freq | 5.6 kHz | 1.6 kHz |
| 8 Actualx/s-curve Freq | 5.2 kHz | 2.0 kHz |
| 9 Peak detected point/prd | 4 | 8 |
| 10 Processor data rate | 20.8 kHz | 15.6 kHz |
| 11 Processor data period | 48.00 uS | 64.00 uS |

TABLE 20-continued

| | KaBand | X/K Band |
|---|---|---|
| 12 Decimation Rate | 16 | 16 |
| 13 Points/Sweep | 2604 | 781 |
| 14 Instructions/uSec | 4 | 4 |
| 15 Instruction/Input Point | 192 | 256 |

Item #11 in TABLE 20, the processor data period, is the time it takes the ASIC to collect and produce a new complex output value. It is critical to the program operation because it determines the maximum execution time available to the c15 for processing each new value. Given the processor's clock rate, the maximum number of executable instructions per sample can be calculated and is shown as item #15. Since ASIC 50 holds this value until a new one is available, there is actually more time available between consecutive inputs as long as processing takes an equivalently shorter term in the ensuing interval.

The sweep processing takes advantage of this fact because of the nature of its process. In every data acquisition interval a routine set of steps must take place. The complex value must be read from the ASIC and averaged into memory. Averaging improves the signal to noise ratio. To make the best use of time until another sample is available, peak detection processing is also handled during the sweep.

B. Averaging

Averaging is done across ensembles of sweeps such that a given point in the average always relates to the energy at the same time through the sweep. Averaging is normally performed over an ensemble of data records to produce a single averaged spectrum. Once this averaged spectrum has been acquired it is examined and observations concerning its signal content can be made. If 20 or 30 records of sweep data are averaged before further analysis can be performed, the radar detector would be too slow in announcing the presence of a detected signal. If only 2 or 3 are averaged between each analysis, substantial benefit from the averaging operation is lost. An alternative approach is required that will produce a continuously updating result.

The selected technique is called a "sliding average." Given a new record z(k), and the last average Z(k), the next average Z'(k) will be computed from the following expression. Variables A and B must be chosen relative to competing goals.

$$Z'(k) = A * z(k) + B * Z(k)$$

where
$A + B = 1$; ($A = 0.1$ is typically used)
$z(k) =$ the newest output resulting from a sweep $Z(k)$ is the last ensemble average
$Z'(k) =$ the next ensemble average Since $Z'(k)$ will be peak detected at the end of each sweep it is desirable that signals present in $Z'(k)$ will exceed threshold (and create an alarm) in relatively few sweeps. The number of sweeps between the introduction of a signal and the time of the alarm is the response time of the product. For the greatest possible response time, A should be as large as possible. Assuming that the output of the FM demodulator is Gaussian noise if no input is present, the signal to noise of $Z'(k)$ is directly related to how close B is to 1. Therefore, to optimize signal to noise, A should be made as small as possible.

In practice, the values of (0.1, 0.9) are used for A and B, respectively. This provides adequate sensitivity but falls somewhat short of needed response time. Response time is enhanced by also examining the unaveraged signal and applying a higher threshold. This operation is performed in addition to the thresholding of the averaged data set. As a result, a signal can be detected by either process.

As the output of the sliding window DFT is complex, the averaging operation involves two 'real by complex multiplies' and a 'complex add' for each of the $Z(k)$'s.

C. No Averaging

An alternative to averaging is to calculate the magnitude of each point and compare it to a threshold to determine if a signal is present. A good approximation to this can be achieved by thresholding only every Nth value. This is possible because each output corresponds to a one point shift in the window and the fact that shifting the window several points into the s-curve will produce little change in the fundamental energy measured. In fact, if the window contains 75% of the s-curve, it will still accurately measure the fundamental component within 3 dB. The concept of ignoring all but every Nth output value is called 'decimation by N.'

D. Peak Detection

Figure 6:
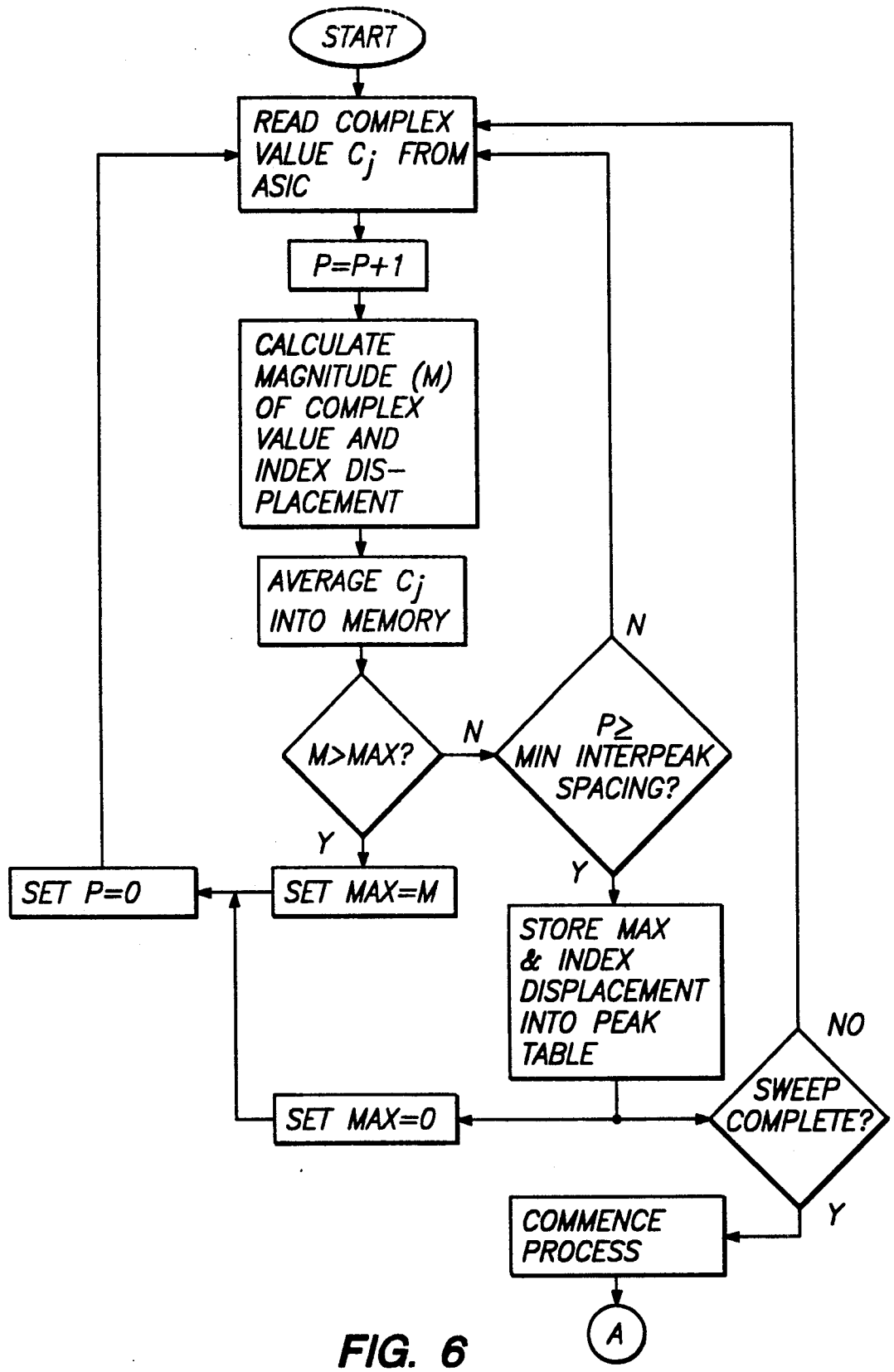
FIG. 6 is a flow chart showing steps performed in the Sweep and Peak Detection Processing used in the embodiment of FIG. 1.

FIG. 6 represents a flow chart outlining the basic steps involved in one embodiment of peak detection. The magnitude 'm' of each value is calculated and compared to the largest value 'max' received in the last 'p' point interval. If 'm' exceeds 'max', then 'max' is set to 'm,' 'p' is set to 0, and another complex value is read from the ASIC. If not, and if 'p' exceeds a constant, the peak index displacement and magnitude of 'max' are incorporated via a bubble sort procedure into a peak table and 'p' is set to 0 before returning to read another complex value from the ASIC.

Because of the nature of the peak detection algorithm just described, it is impossible for two consecutive admissions to the peak table to ever occur. As a result, the bubble sort operation can extend into the following data acquisition interval as previously proposed.

Figure 7:
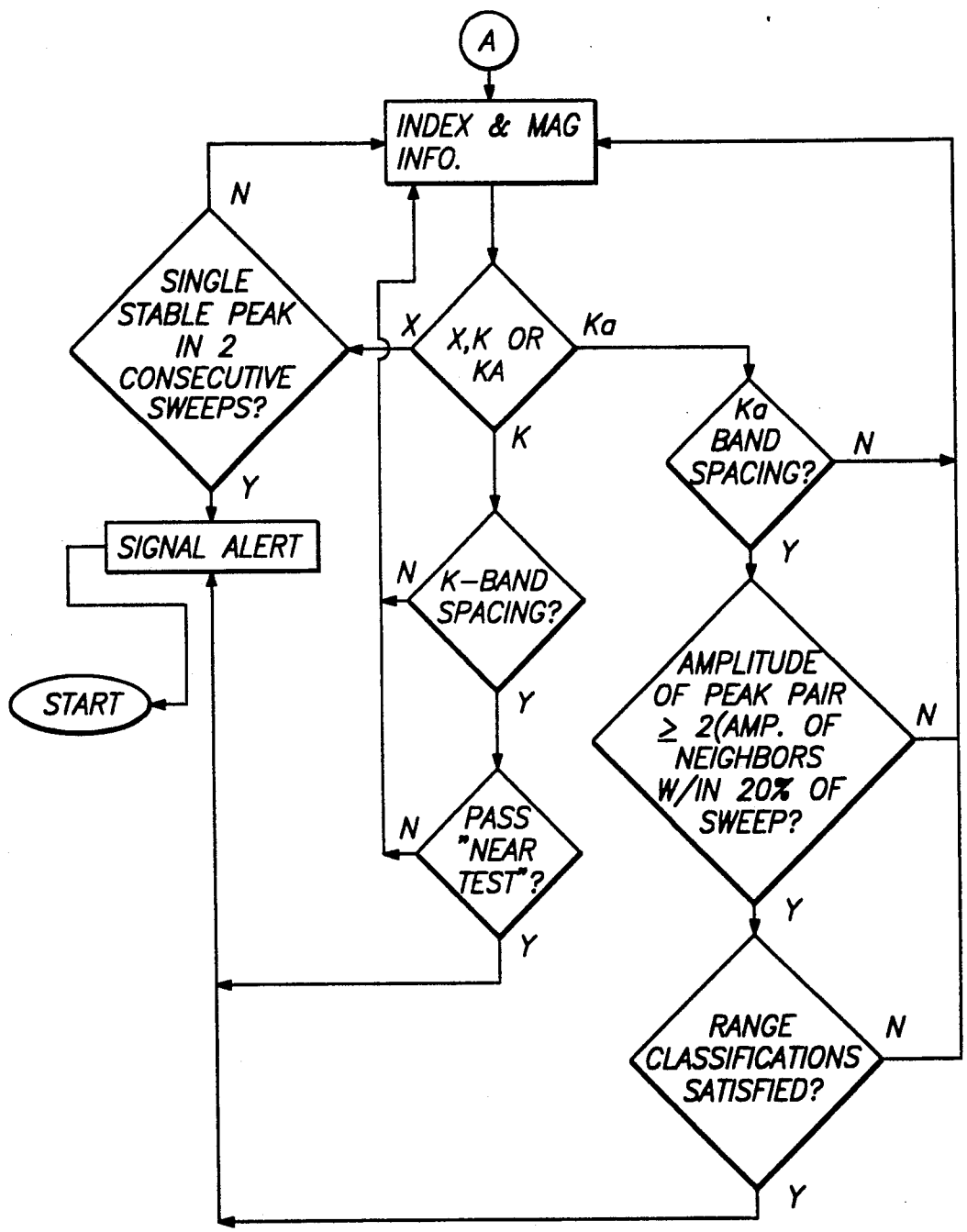
FIG. 7 is a flow chart showing the PROCESS step of FIG. 4 in more detail.

After the sweep has been completed, an array of peak index displacement and magnitude values are available for analysis. This is handled by a routine called "PROCESS". Some of the steps undertaken during this routine are shown in FIG. 7. PROCESS sets peaks for the X/K sweep differently than it sets peaks for the Ka sweep. PROCESS examines index displacement and magnitude information and determines if a valid signal is present in the associated band. It is called once for each band type. An X band detection (also called an 'alert') can occur if there is a single stable peak. Stability is determined by testing the location of the peak to see if it is in the same position in two consecutive sweeps. This is the same as testing the peak index displacement from two sweeps for a maximum acceptable shift.

K and Ka band processing is more complex. In recent years, a growing number of automatic door openers have been designed to use microwave signals to detect the proximity of people. These appear as X band sources to radar detectors. As a result, X band alerts are not taken as seriously by many radar detector users. By corollary, K and Ka band alerts are taken more seriously and the software is written to be more discriminating in its decision to announce K and Ka alerts. Additional information in the peak set is used to further define the K and Ka decision.

Due to the nature of the radar detector receiver design, two s-curve signals are actually generated during a sweep if any of X, K, or Ka signals are present. The second s-curve is generated when the negative image of the real s-curve is swept by the receiver. Both the primary and image s-curves will result in a peak entry in the peak table which is passed to PROCESS. The index displacement between these peaks will depend on whether the source is X or K. This distance is calculated and used as an added constraint in a K band detection. Interfering sources such as door openers can occasionally appear to have K band spacing properties. This can occur if there is a multitude of sources such as from a shopping mall. At the right distance weak signals received from shopping mall sources can produce signals of just about any type.

To improve this situation, an added constraint is required for K band detection. Not only must the signal have K band spacing, its two peak elements must not be near any other elements. This is called the "near test" and is also handled by PROCESS.

Ka Band processing has some similarity to K band processing. Two peaks are admitted to the peak list if a Ka band source is present. If they have the correct spacing, a Ka alert is generated. However, the rejection of interfering radar detectors adds yet another requirement to the process.

Interfering detectors introduce 6 peak elements to the peak table. This 6 element set has a well defined ratio of amplitudes for a strong signal but loses lower amplitude elements as the offending detector moves away. The 6 peak set also has moderate spacing distinctions from the real pair. But the primary center pair of the 6 peak set is very close to the same spacing as it would be from a true Ka pair. Adding a constraint to PROCESS that says to ignore pairs that are near other elements helps but is not sufficient to prevent false alarms in many cases. However, the "near test" used for K band discrimination can still be used with some important modifications.

The solution involves the addition of more requirements for Ka band detection. To detect, the peak pair must be twice the amplitude of all neighbors within a 20% range in the sweep as well as have the right spacing. Furthermore, the amplitude of the peaks is classified into 1 of 4 ranges. If they are in the lowest range, four additional Ka band sweeps must produce consistent results to detect. If in the highest range, only two sweeps are required for a detection. This approach has the effect of increasing the response time of the unit in the cases where less is known about the signal. More "looks" at weaker signals increases the certainty of their type. This in turn, improves the quality of their identification.

Due to the nature of the receiver design, interfering signals can only appear in the middle 50% of the Ka sweep. This fact can be used to shortcycle the peak classification requirements applied to weaker signals. If the Ka source is outside the center 50% region of the sweep, only 2 sweeps of data will be required for classification.

Sensitivity is improved for X & K band signals by applying a detection method called "Weaksignal K band processing." After the previous detection methods have been completed, the strongest pair in the sweep is located. The amplitude of the pair need not exceed the detection threshold. The energy present in the two peaks is accumulated. If the pair moves, the accumulator is set to zero. If the pair remains in the same position over a period of sweeps, the accumulated value will exceed the weaksignal threshold. An X band alert is always issued in this event. Even though this may take a long time, the usable sensitivity of the unit is actually increased. This is beneficial when approaching a microwave source from great distance.

E. Combined use of averaged and unaveraged data.

The problem with the sliding average method is response time. Response time is improved by keeping the unaveraged peak data during sweep processing. The unaveraged peak data must be handled with the same detection constraints that are applied to averaged data. The software was designed to handle this data in a two step process. First, the averaged peaks are processed. Then the unaveraged peaks are combined with the averaged set using an algorithm called "COMBINE". COMBINE admits unaveraged peaks by replacing averaged peaks with unaveraged if they are within a close distance. If unaveraged peaks are not near any averaged peaks, they are admitted using a bubble sort procedure. If the peak table is full, smaller peaks are eliminated.

The approach taken with COMBINE had several drawbacks. The most severe was in its susceptibility to MAXON ® interference. Certain radar detectors such as a model called MAXON ® can be detected as if a conventional X band source. The "New Escort" used a similar analysis procedure based on the examination of averaged and unaveraged peaks. In the "New Escort" software the transient peaks never made it into the historic archive. The approach taken here with COMBINE permits this to occur. As a result, the probability of MAXON ® and transient false alarms is unacceptably high. Since this only occurs in the X/K sweep cycle and not in the Ka sweep cycle, an additional constraint has been incorporated. If the two transient peaks are not spaced within legitimate X or K band tolerances, they are not combined into the average peak table.

4. Other Features

The radar detector has an LED meter that indicates signal strength. It also increases beep rate in proportion to signal strength. Signal strength cannot be accurately measured from the amplitudes in the peak component table. Instead, it must be measured by using the AM output from the FM demodulator (referred to as the "stick" line.) This measurement must be collected during the sweep at the same time the FM output presents s-curves that meet the detection rules previously set forth.

The "New Escort" handled this requirement by digitizing and storing the stick value during each sweep. If a signal was detected the corresponding value from the stick data set is selected and used as the signal strength measurement. The approach taken in the new product involves the use of a peak hold circuit that is attached to the stick output line. The c15 enables the peak hold circuit if it has previously detected a possible signal in that region of the sweep. At the end of the sweep, the voltage measured on the peak hold circuit is digitized and used as the signal strength value. In this scheme, only one value needs to be digitized rather than then entire sweep.

A/D conversion is accomplished by using an address counter in the ASIC which is connected to an off chip D/A ladder circuit. The counter is incremented while testing the output of a comparator for a transition. When the comparator output is true (low), the count value is accepted as being proportional to the voltage at the other comparator input. The worst case A/D conversion time was measured at 140 uS for a full scale stick value.

We claim:

1. A method for discriminating between valid and invalid wide Ka band police radar signals with a radar detection apparatus, wherein the radar detection apparatus includes an antenna for receiving an incoming signal, a voltage controlled oscillator for generating a sweeping signal, a mixer for mixing the incoming signal with the sweeping signal to form an intermediate signal, a down converter and a demodulator for processing the intermediate signal and thereby generating an output signal for any incoming signal that falls within a predetermined frequency range, wherein the output signal is a pair of single cycle sinusoids having a characteristic time spacing therebetween, and a processor for evaluating the output signal and generating an alarm signal, said method comprising the single step of evaluating the time spacing between sinusoids, wherein a valid wide Ka band signal is present when one pair of single period sinusoids are present in the predetermined range and an invalid wide Ka band signal is present when multiple pairs of single period sinusoids are present in the predetermined range, said multiple pairs of sinusoids having time spacings that correspond to harmonic frequencies of incoming signals other than wide Ka band signals.

2. A radar detection apparatus for processing incoming radar signals, comprising:
    means for receiving the incoming signal;
    means for generating a sweeping signal;
    means for mixing the incoming signal with the sweeping signal to form an intermediate signal;
    means for down converting and demodulating the intermediate signal to form an output signal for any incoming signal that falls within a predetermined frequency range, wherein the output signal is a pair of single period sinusoids having a characteristic time spacing therebetween; and
    means for evaluating the time spacing between each sinusoid pair, wherein a valid wide Ka band signal is present when only one sinusoid pair is present in the predetermined frequency range and an invalid wide Ka band signal is present when multiple pairs of sinusoids are present in the predetermined frequency range, each of said multiple pairs of sinusoids having time spacings therebetween that correspond to harmonic frequencies of incoming signals other than wide Ka band signals.

3. A radar signal detector comprising:
    detection means for detecting a signal in the X, K, and Ka signal bands;
    demodulating means for down converting the signal detected by said detection means and producing an output signal, wherein said output signal is a pair of single period sinusoids;
    high rate processing means for receiving the output signal and for calculating a Discrete Fourier Transform ("DFT") of the output signal; and
    low rate processing means for evaluating the DFT calculated by the high rate processing means to determine whether the output signal represents a valid radar signal.

4. The radar detector of claim 3, wherein the high rate processing means comprises:
 means for converting the output signal to a digital signal;
 means for collecting a plurality of digital signals; and
 means for performing the DFT on the digital signal and for generating a set of complex values therefrom.

5. The radar detector of claim 3, further comprising means for generating a sweep cycle and means for generating a reference value k, and wherein the high rate processing means comprises:
 comparator means coupled to the storage means and to the demodulating means for generating a digital signal based on a comparison of the output signal to the value k, wherein the digital signal has a first binary value if the output signal is within a range of $+/-k$, a second binary value if the output signal is greater than $+k$, and a third binary value if the output signal is less than $-k$;
 shift register means for receiving the digital signal, wherein for each sweep cycle a new digital signal is generated by the comparison means and shifted into the shift register and an old digital signal is shifted out of the shift register; and
 arithmetic means coupled to the shift register for calculating the DFT of the digital signal and for generating a set of complex values therefrom.

6. The radar signal detector of claim 3, wherein the high rate processing means is incorporated into an Application Specific Integrated Circuit ("ASIC") employing a pipelined architecture.

7. The radar signal detector of claim 3, wherein the low rate processing means comprises:
 means for selecting and storing the predetermined frequency range;
 means for selecting and storing a predetermined threshold;
 means for reading the complex values from the high rate processing means; and
 means for comparing the set of complex values to the predetermined threshold, wherein a valid radar signal exists when the magnitude of the complex values exceeds the predetermined threshold.

8. The radar signal detector of claim 6, wherein the low rate processing means is incorporated into a single digital signal processing chip.

9. A radar signal detection apparatus, comprising:
 an antenna for receiving an incoming signal;
 a voltage controlled oscillator for generating a sweeping signal;
 a mixer for mixing the incoming signal with the sweeping signal to form an intermediate signal;
 a down converter for processing the intermediate signal and thereby generating an output signal for any incoming signal that falls within a predetermined frequency range, wherein the output signal is a pair of single cycle sinusoids having a characteristic time spacing therebetween;
 high rate processing means for calculating a Discrete Fourier Transform for the output signal and for generating a set of complex values therefrom; and
 low rate processing means for evaluating the set of complex values, wherein a valid radar signal exists when the magnitude of the complex values exceeds a predetermined threshold.

10. A radar detector, comprising:
 an antenna for receiving an incoming signal;
 a first oscillator for generating a sweeping signal;
 a first mixer coupled to the antenna and to the first oscillator, said first mixer generating a first intermediate signal;
 a first amplifier coupled to the first mixer;
 a second mixer coupled to the first amplifier;
 a second amplifier coupled to the first mixer;
 a summing circuit coupled to the second mixer and to the second amplifier;
 a third amplifier coupled to the summing circuit;
 a bandpass filter coupled to the third amplifier;
 a quadrature detector coupled to the bandpass filter for generating an output signal for any incoming signal that falls within a predetermined frequency range, wherein the output signal is a pair of single cycle sinusoids having a characteristic time spacing therebetween;
 high rate processing means coupled to the quadrature detector for calculating a Discrete Fourier Transform for the output signal and for generating a set of complex values therefrom; and
 low rate processing means coupled to the high rate processing means for evaluating the set of complex values, wherein a valid radar signal exists when the magnitude of the complex values exceeds a predetermined threshold.

11. A method for discriminating between valid and invalid wide Ka band police radar signals, comprising:
 receiving an incoming signal;
 mixing the incoming signal with a sweeping signal to form an intermediate signal;
 down converting and demodulating the intermediate signal to thereby generate an output signal for any incoming signal that falls within a predetermined frequency range, said output signal having at least a primary peak pair of single cycle sinusoids having a characteristic time spacing therebetween; and
 evaluating the output signal to determine whether a valid Ka signal exists,
 wherein if the output signal has only the primary peak pair with the characteristic time spacing then a valid Ka signal exists, and
 wherein if the output signal also has a plurality of secondary peak pairs of single cycle sinusoids present within a predefined time spacing of the primary peak pair, then a valid Ka signal is present if the time spacing of the primary peak pair is within a predefined range and if the amplitude of the primary peak pair is greater than or equal to twice the amplitude of the secondary peak pairs.

* * * * *

UNITED STATES PATENT AND TRADEMARK OFFICE
CERTIFICATE OF CORRECTION

PATENT NO. : 5,305,007
DATED : 04/19/94
INVENTOR(S): Steven K. Orr and John R. Kuhn It is certified that error appears in the above-identified patent and that said Letters Patent is hereby corrected as shown below:

Column 8, lines 12-13, should read:

$$H_{L+1}(1/NT) = H_L(1/NT) + [e^{j2\pi L/N} * [h(LT) - h((L-N)T)]]$$

Signed and Sealed this

Seventh Day of March, 1995

Attest:

BRUCE LEHMAN

Attesting Officer

Commissioner of Patents and Trademarks